Jan. 8, 1924.

C. SANG 1,480,351

RATCHET MECHANISM FOR AGRICULTURAL IMPLEMENTS

Filed June 16, 1920

INVENTOR.
Charlie Sang.
BY Chas. E. Townsend
ATTORNEY.

Patented Jan. 8, 1924.

1,480,351

UNITED STATES PATENT OFFICE.

CHARLIE SANG, OF CASTORVILLE, CALIFORNIA.

RATCHET MECHANISM FOR AGRICULTURAL IMPLEMENTS.

Application filed June 16, 1920. Serial No. 389,234.

*To all whom it may concern:*

Be it known that I, CHARLIE SANG, a citizen of the United States, residing at Castorville, in the county of Monterey and State of California, have invented a new and useful Improvement in Ratchet Mechanism for Agricultural Implements, of which the following is a specification.

The invention relates to a clutch mechanism for agricultural machines.

The object of the present invention is to provide for agricultural machines a simple, practical and efficient clutch mechanism for connecting the rear traction wheels of an agricultural machine with the rear axle thereof and to enable the clutch mechanism to operate as a differential for driving the rear axle in a forward direction while the wheels rotate forwardly and also to operate as a differential in turning corners or when the wheels are otherwise retarded.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction, within the scope of the claim, may be resorted to without departing from the spirit or sacrificing any of the advantages of the invention.

In the drawings, in which like characters of reference designate corresponding parts in the several views:—

Figure 1:
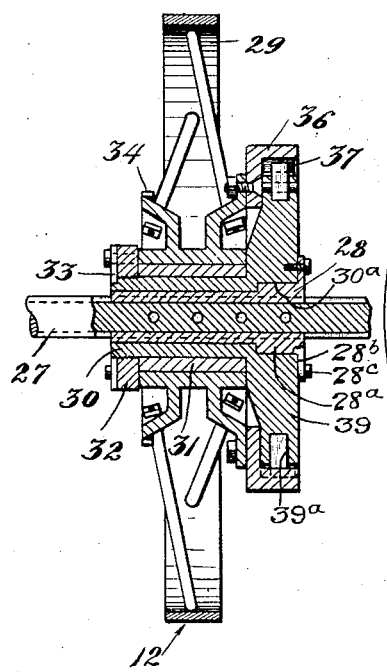
Figure 1 is a sectional view taken longitudinally through one end of the rear axle and through one of the rear wheels and illustrating the improved clutch mechanism.

The rear axle structure 12 consists of a rotatable rear axle 27 upon which a sleeve 28 is splined. This sleeve is formed with a hub through which the axle 27 extends and upon which the wheel 29 is mounted. The wheel 29 serves as a traction wheel for driving the mechanism of an agricultural machine. The hub 30 of the sleeve structure 28 is provided with a bushing 31 upon which the wheel 29 is directly mounted. A lock washer 32 holds the hub in position and is positively secured by a lock plate 33. A sprocket wheel 34 is fixed to the wheel 29 and drives the mechanism.

Figure 2:
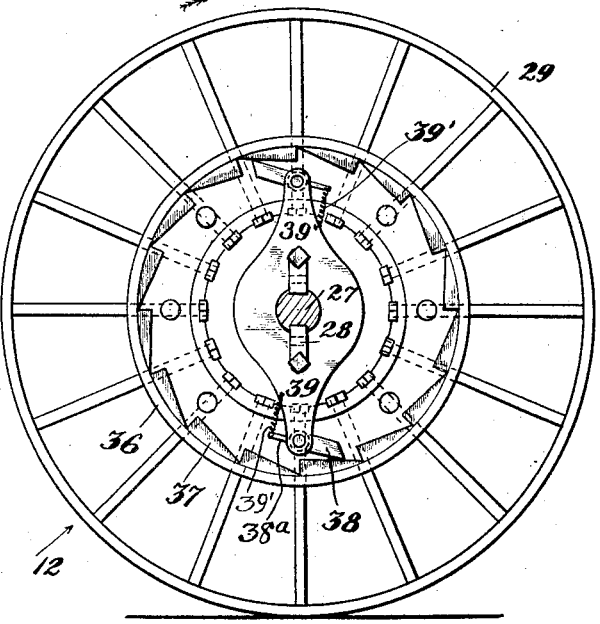
Figure 2 is a view in elevation, illustrating the rear axle, clutch or differential.

In order that the axle may have differential movement when turning corners or when the wheels are otherwise retarded, a differential mechanism is mounted within each of the wheels. This mechanism comprises a drum 36 which is bolted to the outer face of each of the wheels and is formed with ratchet teeth 37 extending entirely around its inner periphery. These ratchet teeth are adapted to be engaged by pawls 38 which are carried upon arms 39 forming a part of the sleeve structure 28. These pawls are held in their outermost positions and in frictional engagement with the teeth 37 by means of springs 39'. As the hub 30 of the sleeve 28 is keyed to the axle 27 it will be seen that when the wheel 29 rotates in the direction of the arrow —*a*—, as shown in Figure 2, the pawls will positively engage the square faces of the ratchet teeth and will thus insure that rotation of the axle will take place. In the event that a turn is being made or for other reasons one wheel is moving faster than the other, the pawls on the slow-moving wheel will be passed by the ratchet teeth without engagement as this wheel rotates in a counter direction from its normal position or when the wheel is standing still. The sleeve 28 is provided at its outer end with an enlargement 28$^a$, which is arranged in a counter-bore 30$^a$ of the sleeve 30 and the enlarged outer end of the sleeve 28 is provided with a flange 28$^b$ secured by suitable fastening devices 28$^c$ to the outer faces of the arms 39 of the sleeve 30. The wheel is retained on the bushing 31 between the arms 39 and the lock washer 32. The pawls 38 are pivoted in bifurcations 39$^a$ of the arms and are provided with rearwardly extending portions 38$^a$ to which the springs 39' are connected.

Having thus described my invention, what I claim and desire to secure by Letters Patent, is:

In a device of the character described, a rotatable axle, an axle sleeve keyed to the axle and provided at its outer end with an enlargement, a hub sleeve mounted on the axle sleeve and provided with a counter-bore to receive the enlargement, said hub sleeve being provided with projecting arms, means for securing the enlargement of the axle sleeve to the arms of the hub sleeve, a wheel mounted on the hub sleeve, means secured to the hub sleeve and cooperating with the said arms for retaining the wheel in position on the hub sleeve, a ratchet ring carried by the wheel, and pawls pivotally mounted on the arms and engaging the ratchet wheel whereby rotation of the axle will be produced only upon rotation of the wheel in one direction.

In testimony whereof I have hereunto set my hand in the presence of two subscribing witnesses.

CHARLIE SANG.

Witnesses:
ELLA ENEVOLDSEN.
C. C. BAKER.